Feb. 9, 1954　　　E. R. GOLDFIELD ET AL　　　2,668,912
X-RAY APPARATUS
Filed May 27, 1949　　　　　　　　　　　　　6 Sheets-Sheet 4
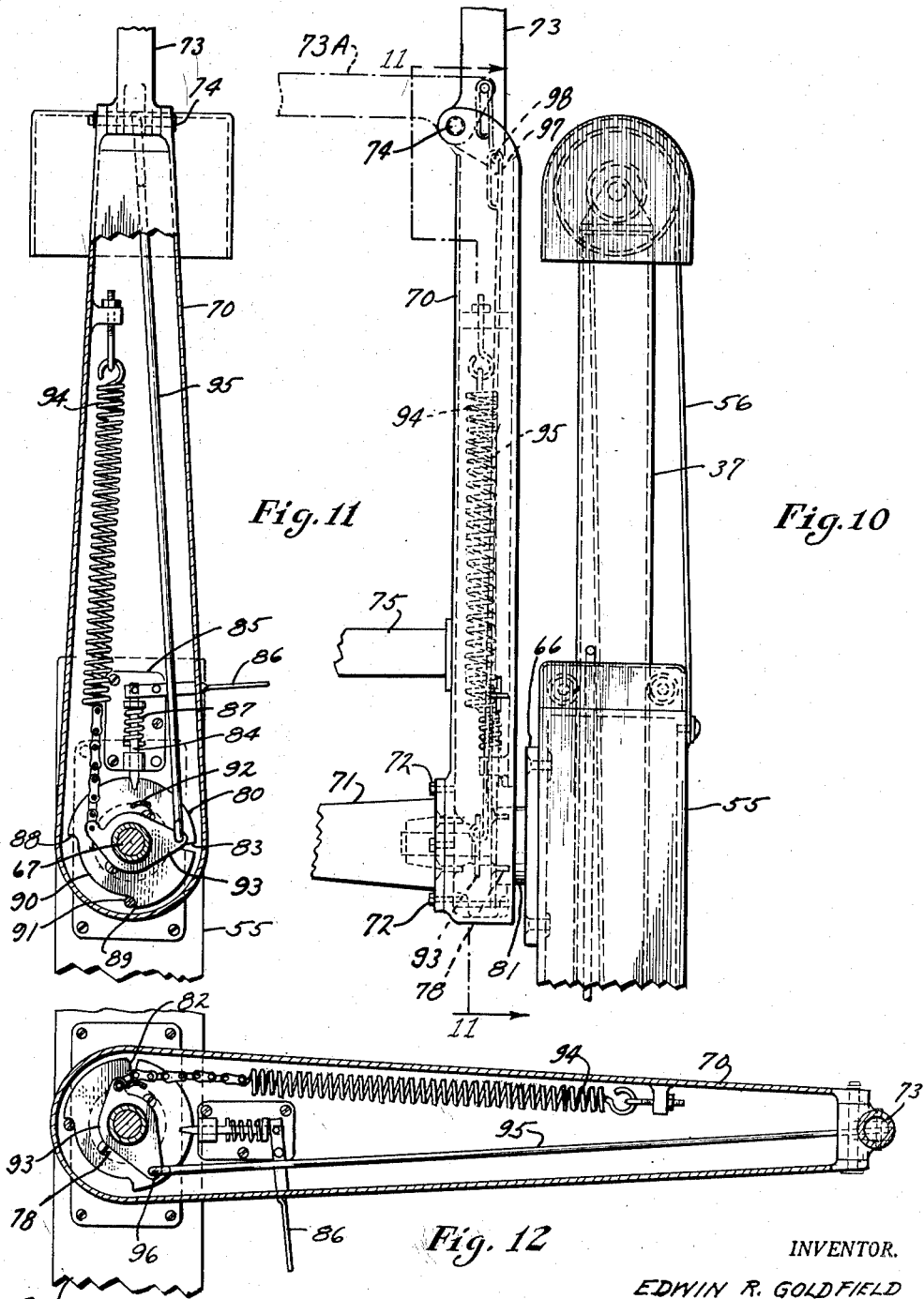
INVENTOR.
EDWIN R. GOLDFIELD
ROBERT J. STAVA
BY- Bates, Teare & McBean
ATTORNEYS

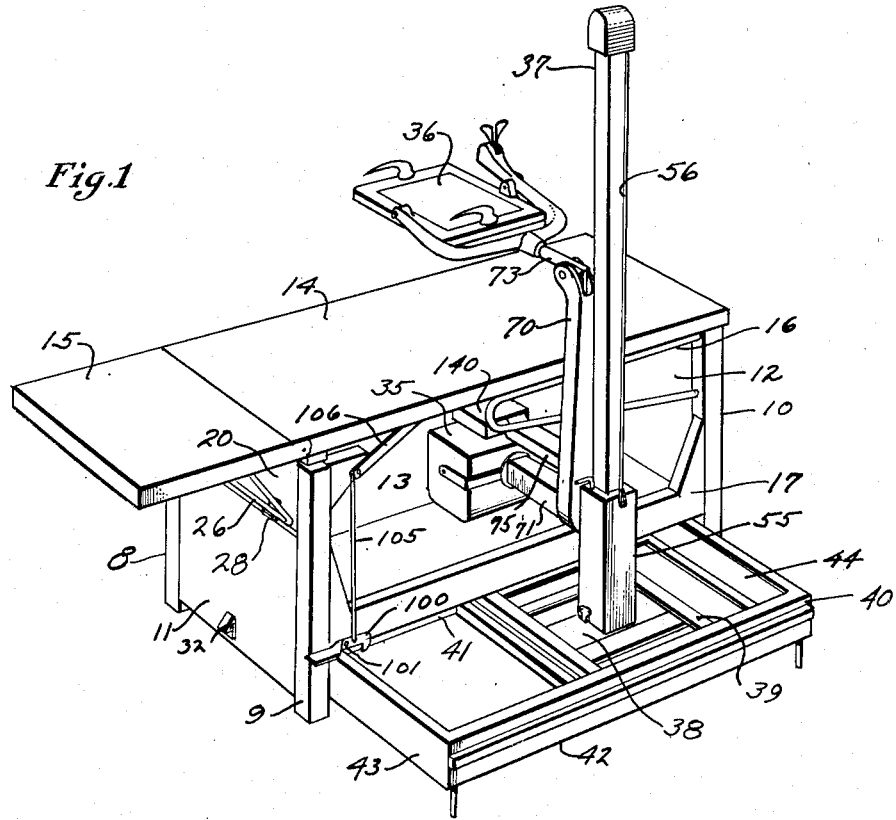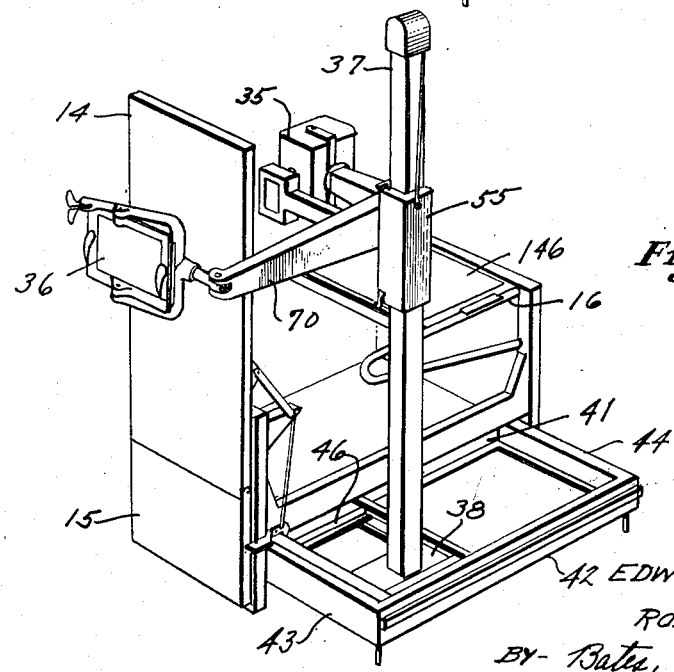

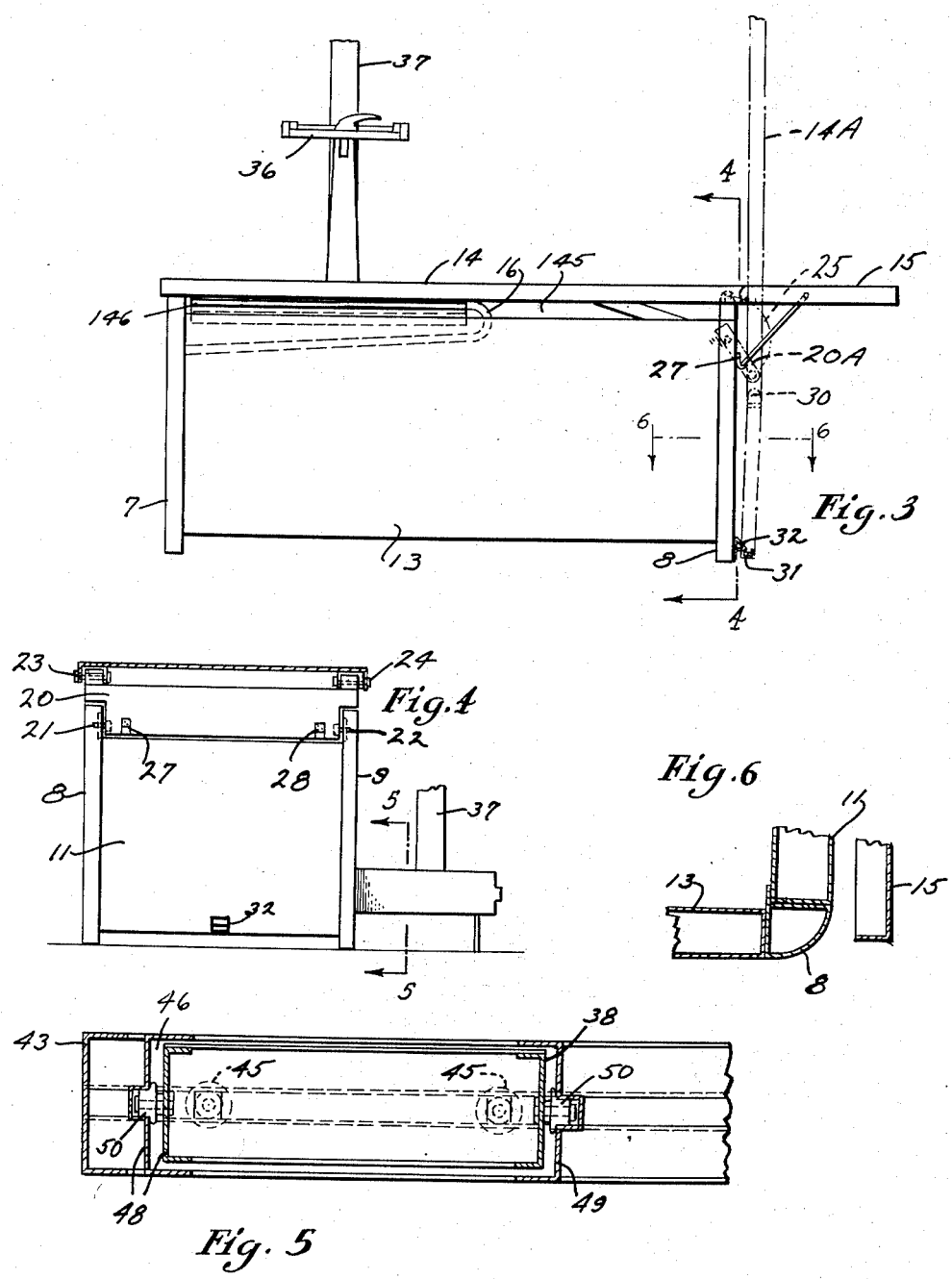

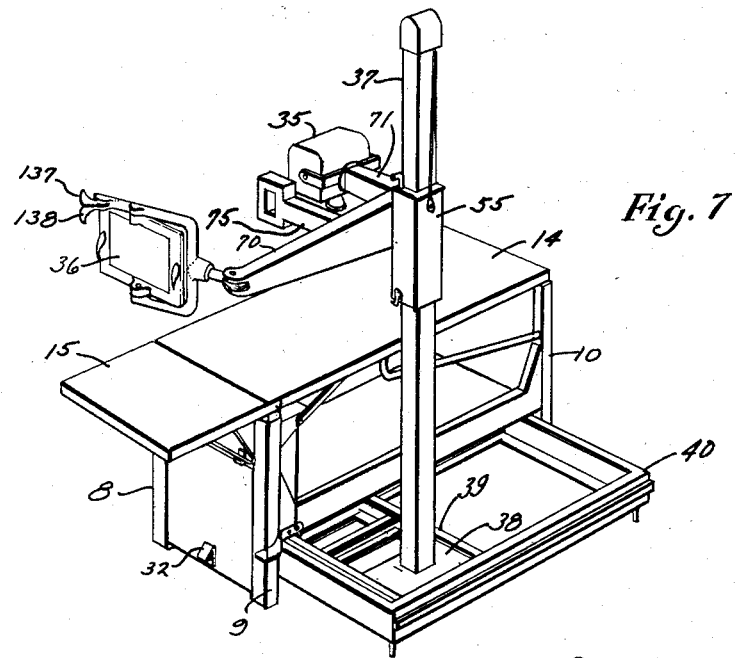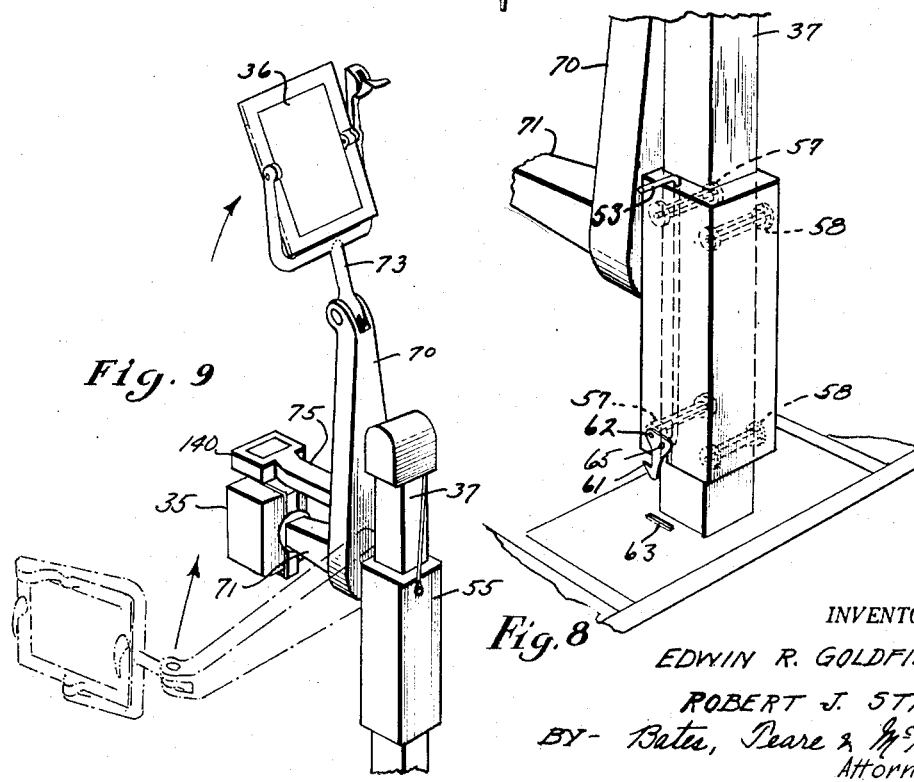

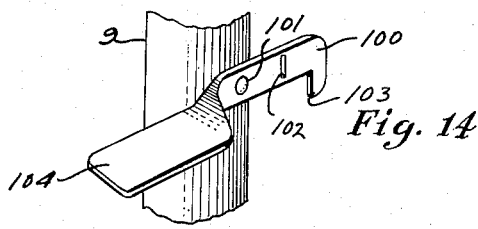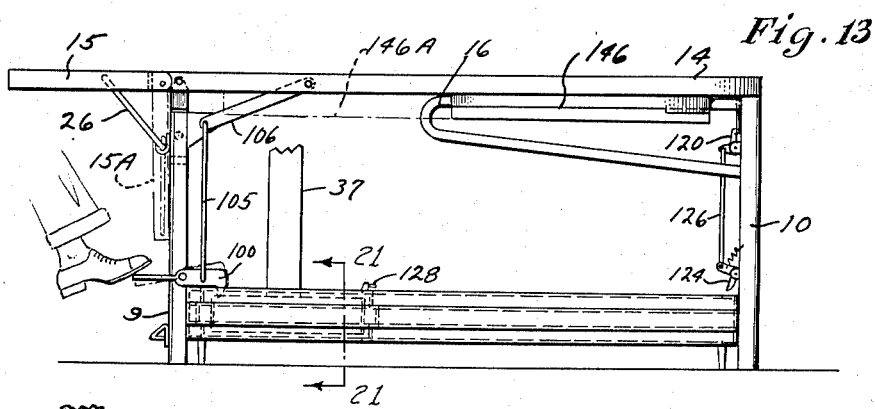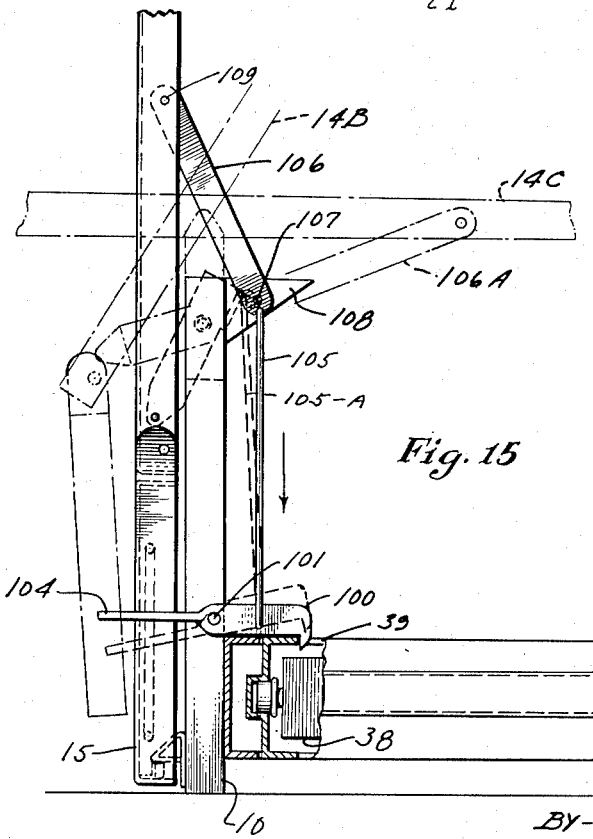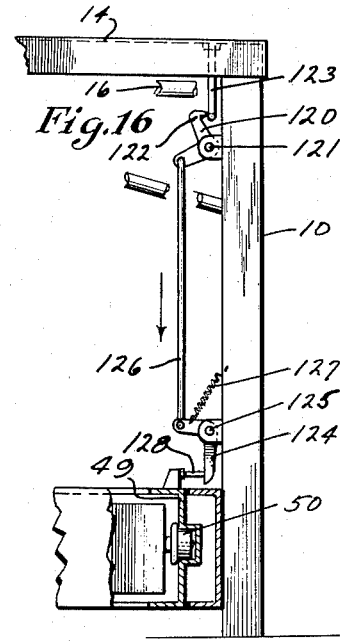

Feb. 9, 1954    E. R. GOLDFIELD ET AL    2,668,912
X-RAY APPARATUS
Filed May 27, 1949    6 Sheets-Sheet 6
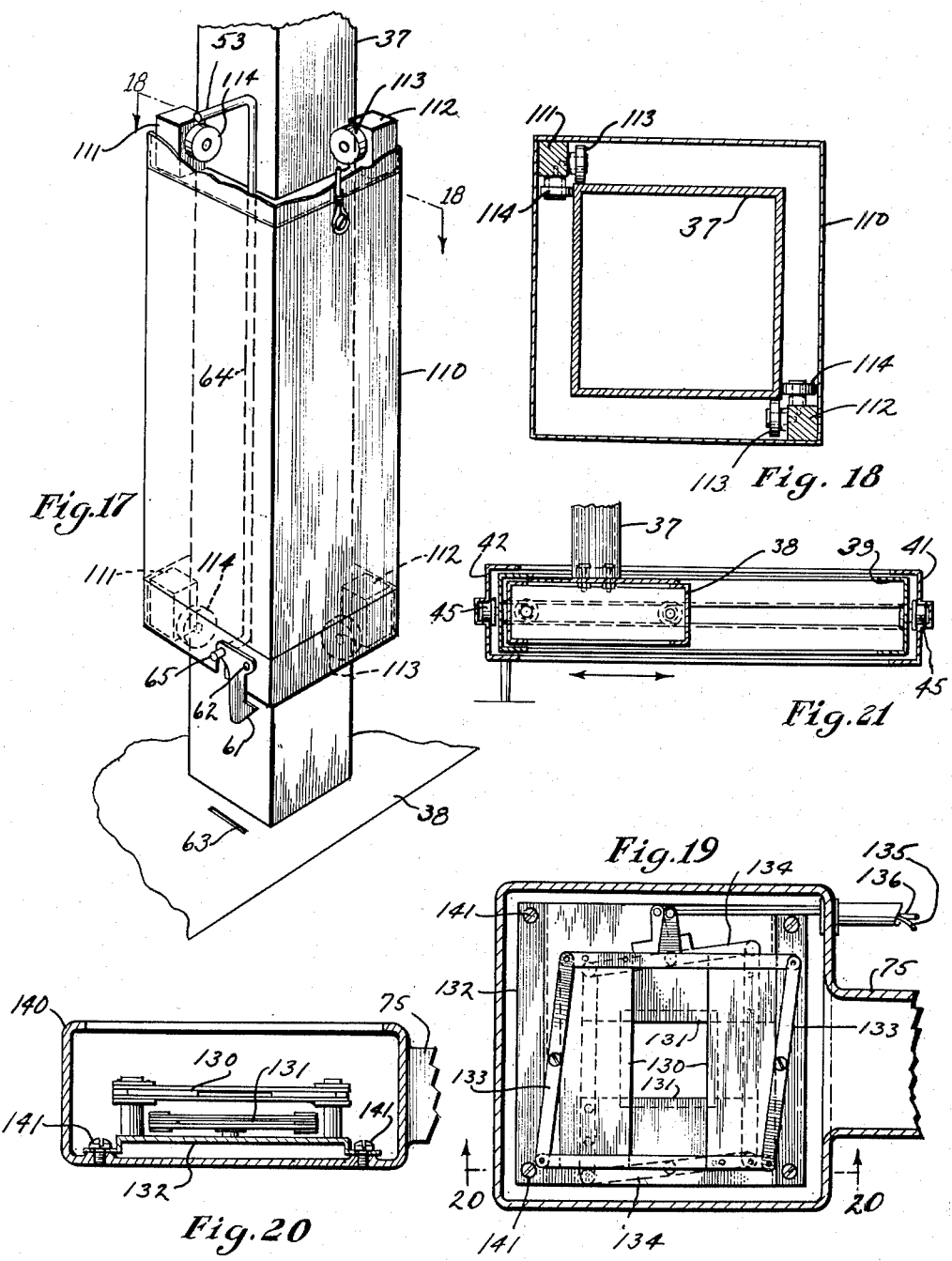
INVENTOR.
EDWIN R. GOLDFIELD
ROBERT J. STAVA
BY- Bates, Teare & McBean
Attorneys Patented Feb. 9, 1954

2,668,912

UNITED STATES PATENT OFFICE 2,668,912

X-RAY APPARATUS

Edwin R. Goldfield and Robert J. Stava, University Heights, Ohio, assignors to Picker X-Ray Corporation, Waite Manufacturing Division, Inc., Cleveland, Ohio, a corporation of Ohio Application May 27, 1949, Serial No. 95,684

18 Claims. (Cl. 250—57)

This invention relates to X-ray apparatus of the tilting table type, such as is used for radiography and fluoroscopy.

An object of the invention is to simplify the apparatus by reduction in cost and weight while still retaining the advantages of the more complicated or costly apparatus. In this connection the invention contemplates an arrangement for supporting the tube stand and its associated carriage independently of the table top without curtailment of use of a single X-ray tube for fluoroscopy and radiography, and without curtailment of the fluoroscopic screen unit for either horizontal or vertical fluoroscopy.

A further object of the invention is to obtain the improved aforesaid objects without the necessity for the usual separate, heavy rail mounted stand, whereby there is attained a compact structure that is light in weight, and is capable of being readily moved and manipulated without imposing undue strains on the operator. The invention also includes a construction which eliminates the necessity for a heavy counterweight heretofore used on the tilting table type of apparatus.

Additional objects are to provide means for automatically locking the table top in vertical position; to provide means for preventing tilting of the table top until the tube stand carriage has been moved to a predetermined position with respect to the table top; to lock and hold the tube stand and its associated carriage in a definite position with respect to the table for vertical fluoroscopy; to attain a counterbalance for the fluoroscopic screen unit so as to permit freedom of use thereof in any desired position and at the same time to enable it to clear the table top upon elevation of the same, and to simplify the shutter construction and operation.

In the drawings, Fig. 1 is a perspective view illustrating the table in horizontal position with the tube beneath the table top, and the screen unit above the table top; Fig. 2 is a perspective view showing the table top in vertical position with the tube positioned behind the table top, and the screen unit positioned in front of the table top; Fig. 3 is a side elevation of the table; Fig. 4 is a section taken on a plane indicated by line 4—4 in Fig. 3; Fig. 5 is a section taken on a plane indicated by the line 5—5 in Fig. 4; Fig. 6 is a section taken on a plane indicated by the line 6—6 in Fig. 3, but on a scale larger than that of Fig. 3; Fig. 7 is a perspective view illustrating the table with the top in horizontal position and with the fluoroscopic screen unit and tube positioned above the table; Fig. 8 is a perspective view illustrating a modified form of vertical carriage; Fig. 9 is a perspective view illustrating different operative positions of the fluoroscopic screen unit with respect to the tube; Fig. 10 is a fragmentary side elevation of the column and a portion of the tube and screen supporting unit; Fig. 11 is a section taken on a plane indicated by the line 11—11 in Fig. 10; Fig. 12 is a section similar to Fig. 11 but showing the arm of Fig. 11 in horizontal position; Fig. 13 is a side elevation of a table taken from the side opposite to that shown in Fig. 3; Fig. 14 is a perspective view illustrating a locking lever that is used for holding the tube stand carriage in a definite position with respect to the table when the table top is tilted to a vertical position; Fig. 15 is a side elevation partly in section showing the mechanism for holding the table top in vertical position; Fig. 16 is a fragmentary side elevation, partly in section, showing a mechanism for holding the table top in horizontal position; Fig. 17 is a perspective view illustrating a modification of the vertical carriage; Fig. 18 is a section taken on a plane indicated by the line 18—18 of Fig. 17; Fig. 19 is a longitudinal section taken through the shutter housing; Fig. 20 is a section taken on the plane indicated by the line 20—20 in Fig. 19, and Fig. 21 is a section taken on a plane indicated by the line 21—21 in Fig. 13.

The apparatus shown in the drawings comprises a table having legs 7, 8, 9 and 10, end panels 11 and 12, a side panel 13, a top 14 and an extension panel 15 for the top. The side opposite the panel 13 is open except for a Bucky track in the form of a U-shaped bar or tube 16, the ends of which are securely fastened to the leg 10. The track 16 terminates short of the length of the table so as to provide a well through which the tube supporting arm can be moved so as to change the tube from a position beneath the table to one above the table, as is shown for example in Figs. 1 and 2 respectively. In addition to the Bucky track, the open side of the table has a beam 17 extending lengthwise thereof and rigidly connected to the legs 9 and 10 and spaced above the bottom portion of the panels 11 and 12.

The table top is adapted for use with horizontal and vertical fluoroscopy, and accordingly the top is hinged at one end for movement from the position shown in Fig. 1 to that of Fig. 2. The hinge construction is so arranged as to flatten the arc made by the free end of the table over that which would be made if the top were hinged directly to the table legs. The purpose of such construction is to avoid striking any part of the tube unit or screen unit, without necessitating the use of a column that extends to an objectionable height above the table. A preferred hinge construction embodies a plate 20 which extends across the end of the table and is pivoted to the legs 8 and 9 at 21 and 22 respectively (Fig. 4). The upper portion of the plate is connected by aligned pivots 23 and 24 to the table top, and the arrangement is such that the plate is substantially vertical whenever the table top is in horizontal position. When the top is in the vertical position, indicated at 14A of Fig. 3, the plate 20 will be in the position shown by the broken lines 20A of Fig. 3. Thus, as the table is tilted, the axis of its pivotal connection to the plate moves outwardly and downwardly, following the path indicated by the arc 25 in Fig. 3. The result of such action is to flatten the arc made by the free end of the table as stated aforesaid.

When the table top is in horizontal position, the extension panel 15 may be disposed in coplanar relationship thereto as is shown in Figs. 1 and 3 and may be so held by means of a bail 26, the ends of which are pivotally connected to the extension, and the intermediate portion of which rests within hook-shaped brackets 27 and 28 on the lower end of the plate 20. In addition to the foregoing position, the extension panel may be swung downwardly to the position shown by the broken lines 15A in Fig. 13, merely by lifting the bail out of engagement with the hooks and allowing the panel to drop.

When the table top is swung to vertical position, the panel operates automatically to lock and hold it in such position. This is accomplished by positioning the extension panel pivot 30 off-center with respect to the table top flange so that the panel will swing inwardly by gravity toward the panel 11 until the flange 31 thereon underhangs an abutment 32 which is attached to the panel 11 adjacent the bottom thereof. Inasmuch as the initial movement for lowering the table top necessitates an outward and upward movement of the pivots 23 and 24, the table top is effectively locked in vertical position until the panel 15 is manually swung out of the path of the abutment.

Cooperating with the table are the usual X-ray tube unit 35 and fluoroscopic screen 36 which are mounted either for conjoint or independent use depending upon whether the operation is fluoroscopic or radiographic. A single X-ray tube suffices for either operation, and the mounting is such as to permit the tube to be positioned either above or below the table whenever the table is horizontal, and to be positioned behind the table whenever the top is disposed in vertical position.

The supporting mechanism for the tube stand and the screen unit includes a column 37 which is disposed at one side of the table and is supported for movement longitudinally and transversely of the table. To this end, the column is rigidly attached to a sub-carriage, indicated in general at 38, which is mounted for movement, transversely of the table, within a main carriage 39, the latter of which is mounted for movement longitudinally of the table, within a stationary frame, indicated in general at 40. The frame is rigidly fastened to the under structure of the table, and embodies an open rectangular structure having longitudinally extending beams 41 and 42 which are connected by end beams 43 and 44 respectively.

The main carriage 39 is shown as an open frame having end plates 46 and 47, each of which carries a pair of rollers 45 for movement within the trackways formed in the longitudinal beams 41 and 42 respectively. The carriage also has side plates 48 and 49 which are formed to provide a trackway for receiving rollers 50 on the sub-carriage 38. Thus, the column and its supported structures may be moved either longitudinally or transversely of the table in accordance with the various positions required for the tube and screen units respectively.

The tube stand and screen unit are mounted upon a carriage 55 which is mounted for vertical movement, along the column, the weight being counterbalanced by suitable counterbalancing mechanism, which is disposed within the column and is connected to the carriage by means of a cable 56. One form of carriage is shown in Fig. 8 as embodying a hollow structure having spaced rollers 57, 58, 59 and 60 journalled therein and as arranged in pairs for engaging opposite sides of the column. A latching finger plate 61 may be pivotally mounted at 62 on the carriage and may pass through a slot 63 in the sub-carriage for locking the vertical carriage in its lowermost position. The finger may be released by pulling upwardly upon a handle 53 which is attached to a rod 64, the latter of which extends through the vertical carriage and is connected at 65 to the finger plate 61.

A preferred manner of connecting the tube stand and screen unit to the vertically movable carriage 55 includes a plate 66 which is affixed to the carriage 55 on the side adjacent the table and which carries a swivel post 67. A swivel arm 70 is mounted on the post for movement about the axis thereof and in a plane parallel to the longitudinal edge of the table top. The arm has a bracket 71 fastened thereto, as by securing members 72, to the outer end of which the tube housing is pivotally supported, and has a screen supporting yoke 73 pivotally connected thereto at 74 adjacent the free end thereof. The screen 36 is pivotally mounted within the yoke in the usual way. The swivel arm 70 also carries a bracket 75 upon which the shutter housing and its associated mechanism are mounted.

The counterbalancing mechanism for the weight of the screen unit is disposed within the swivel arm 70 and is so arranged that when the arm is in the horizontal position, as is illustrated in Fig. 12, the screen supporting yoke 73 can be moved freely within the required range of movement of the screen without requiring the operator to overcome the spring tension of the counterbalance. The arrangement is such, however, that whenever the swivel arm is moved to the vertical position, Figs. 10 and 11, the counterbalance is active and operates to raise the yoke 73 progressively as the arm 70 is lifted, so as to clear the edge of the table.

In a preferred form, the counterbalancing mechanism within the arm 70 includes a relatively stationary disc which is fixed to the swivel post hub 81, as by screws 78. The disc has peripheral notches 82 and 83 which are positioned 90° apart and are adapted to be engaged selectively by a latch pin 84 for holding the arm either in horizontal or vertical position respectively. To this end the latch pin is shown as being slidably mounted within a plate 85 that is carried by the arm 70 and is adapted to be operated by a handle 86 which projects through the side of the arm housing. A spring 87 tends normally to urge the latch to locking position with relation to the disc.

The disc 80 also has a pair of radial shoulders 88 and 89 which are formed by a reduced sector 90 in the periphery thereof, and in the quadrant opposite that included within the peripheral space defined by the notches 82 and 83. Such shoulders act as limit stops for a pin 91 which is fixed to the arm 70. The disc also carries an abutment 92 in the form of a lug which is adapted to engage a bell crank 93 (Fig. 12), and the abutment operates to control the action of the counterbalancing spring 94, whenever the arm 70 is moved to the horizontal position.

In addition to the spring 94 and the bell crank 93, the counterbalancing mechanism includes a rod 95 which is positioned within the arm 70 and which has one end thereof pivotally attached at 96 to the bell crank 93. The other end of the rod 95 is looped backwardly upon itself to form a slot 97 and is adapted to embrace a pin 98 and provide a lost motion connection therewith. The pin in turn is carried by the arm 73 and the relationship is such that whenever the arm 70 is in the vertical position, the pin is disposed at the top of the slot (Fig. 10) and the spring is exerting pressure on the rod 95 to hold the arm 73 in upright position, but that as the arm 70 is moved downwardly toward horizontal position, the abutment 92 arrests movement of the lever 93 before the horizontal position is reached, wherefore continued movement toward horizontal position has the effect of lengthening the rod 94 so as to remove the spring tension from the rod, and thus allowing freedom of motion of the screen unit.

In Fig. 10, the arm 73 is shown in full lines in substantially vertical position. When, however, the arm is swung downwardly to the broken line position 73A, then the rod 95 will be lifted to impose a slight additional loading upon the spring 94. This is advantageous in that the arm and the screen 36 have a slight tendency to move to vertical position whenever the screen is released.

Whenever the apparatus is used for vertical fluoroscopy, it is desirable to lock the tube stand and its associated mechanism in a predetermined position with respect to the vertical table top. This may be accomplished by utilizing a foot operated latch 100 which is pivotally mounted to the table leg 9 at 101. The latch has a finger 103 for engaging behind the top flange of the side rail 48 on the main carriage and has a slot 102 therein for receiving the inturned lower end of a rod 105. The upper end of the rod extends into an opening in a link 106, while the link, in turn, is pivotally connected at 107 to a bracket 108 which is fixed to the table leg 9. The other end of the link is pivotally connected at 109 to the table top.

The full line position of Fig. 15 shows the carriage 39 locked to the table frame and illustrates the vertical position of the table top, while the broken line position 14B indicates the intermediate position, and the broken line 14C indicates the horizontal position. The connection between the rod 105 and the link 106 is off-center with respect to the pivot 107, wherefore, as the link is moved from the full line position of Fig. 15 to the broken line position 106A, the rod 105 is moved to the broken line position 105A and the latch 100 is lifted automatically sufficiently to clear the carriage 39. Thus, when the table top is horizontal the carriage may be freely moved without restriction of the latch, but when the table top is vertical, the latch is in position to hold the carriage. However, the exertion of pressure upon the foot engaging portion 104 enables the latch to be raised and releases the carriage 39 whenever desired for movement of the carriage toward the opposite end of the table.

A modified form of vertical carriage is shown in Figs. 17 and 18 and includes a four-sided housing 110 which has corner posts 111 and 112 that are arranged in pairs on opposite diagonal corners thereof. Each corner post has a pair of rollers 113 and 114 for engaging adjacent faces of the column, wherefore, the load stresses acting on the column are distributed uniformly over the vertical carriage. In this form of construction, the same form of locking device is utilized, as is illustrated in Fig. 8, hence corresponding parts have been designated by the same reference characters as are used in Fig. 8.

To prevent tilting of the table while the tube unit is in such position that it may be struck by the swinging top and thereby subjected to the liability of damage, we provide an arrangement by means of which the table top is locked in horizontal position until the main carriage is moved to the desired position adjacent the head of the table (right hand end as viewed in Fig. 13). At such time the mechanism includes a device for automatically unlocking the table top so as to permit the tilting operation to be performed.

A preferred mechanism for locking the table top includes a latch 120 (Fig. 16) which is pivoted at 121 to the leg 10. The latch is in the form of a bell crank having a finger 122 which is adapted to engage behind a hook-shaped bar 123 that is fastened to the table top. A second bell crank lever 124 is pivoted at 125 to the leg and is connected to the first bell crank lever by a link 126. A spring 127 acts on the lever 124 to keep the finger 122 in locked position with respect to the hook 123. The lever 124, however, is adapted to be swung about the pivot 125 upon engagement thereof by a pin 128, which is carried by the main carriage, and which operates through the linkage system aforesaid to unlatch the table top.

The present invention also includes means for mounting the shutters and operating mechanism therefor within the housing 140 so as to permit assembly of the mechanism as a unit outside the housing, and to facilitate attachment and adjustability therein for centering purposes. This is accomplished by mounting one pair of oppositely moving shutters 130 and a second pair of oppositely moving shutters 131 upon a base plate 132, together with their associated controlling levers 133 and 134 respectively, which are in the form of parallel linkage systems and are adapted to be operated by movement of wires 135 and 136 which connect the respective linkage system to levers 137 and 138, respectively.

The plate 132 is adapted to be attached to the shutter housing 140 by fastening members 141, it being understood that the openings in the plate for receiving the fastening members are sufficiently large to provide adequate clearance for adjusting the plate and centering the shutters with respect to the radiation beam.

An advantage of mounting the shutter housing upon the arm 75 and of fixing the arm to the swivel arm 70, precludes the possibility of having the shutters in the field during horizontal radiography as is shown in Fig. 7. A further advantage of such arrangement is that adequate clearance may be provided between the arm 75 and the tube head to permit the usual high tension cable to sweep through the gap between the tube head and the arm 75 whenever the tube head is rotated with respect to the arm 71.

The top of panel 13 terminates short of the table top (Fig. 3) to provide an opening 145 and a trackway for the Bucky diaphragm. This cooperates with the track 16 to support the diaphragm in any desired position throughout the length of the table. Thus, for example, in Fig. 13, the diaphragm is indicated at 146 above the track in the full line position. In the broken line position 146A, however, the diaphragm is supported entirely on one side by the panel 13 and on the other side by a portion of the Bucky track 16.

An X-ray apparatus made in accordance with the foregoing description is operative to permit use of the unit for fluoroscopy or for radiography with the table top in horizontal position of Fig. 1, and is also suitable for vertical fluoroscopy as is indicated in Fig. 2. The various movements required for transposing the tube and screen units can be accomplished without interferring with the tilting of the table, thus resulting in a compact structure which is light in weight and which is substantially foolproof in its operation. The framework and the carriage construction may be formed of prefabricated parts, while the weight of the screen and tube units may be counter-balanced for ease in manipulation and adjustability.

We claim:

1. X-ray apparatus comprising a table having a stationary supporting frame, a top mounted on the frame for tilting movement with respect thereto, a tube head, a fluoroscopic screen unit, a carriage, means mounting said head and screen unit upon said carriage in spaced relation for adjustment together as a unit about an axis, and means mounting the carriage on the frame for movement longitudinally and transversely of the top, said frame including an opening adjacent one side of the table whereby the tube head may be positioned either beneath or above the top whenever the top is in horizontal position, and whereby the tube head may be moved vertically throughout substantially the length of the top whenever said top is in vertical position.

2. X-ray apparatus of the class described, comprising a table having a frame and a top tiltably mounted thereon, the frame having a lateral extension adjacent the bottom thereof, a carriage movable within said extension in a direction extending lengthwise of the table, a sub-carriage mounted for movement in the first carriage and in a direction extending transversely of the table, a column carried by the sub-carriage, a carriage movably mounted on column, a tube head and a fluoroscopic screen mounted on said carriage for adjustment together as a unit about an axis, said frame having an opening by means of which the tube head may be moved from a position beneath the table top to a position above the top whenever the top is tilted with respect to the frame.

3. X-ray apparatus of the class described, comprising a table having a relatively stationary frame, a member mounted for pivotal movement on the frame adjacent one end thereof, a table top mounted for pivotal movement on said frame, a portion of said frame having a guideway extending longitudinally of the table, a carriage mounted for movement in the guideway, a sub-carriage mounted for movement in the first carriage and in a direction extending transversely of the table, a column carried by the sub-carriage and extending above the table top, a carriage mounted for movement vertically on the column, a tube head and a fluoroscopic screen carried by said vertically movable carriage, said frame having an opening on one side thereof through which the tube head may be moved, whereby the tube head may be positioned either above or below the top whenever the top is in horizontal position, and whereby the tube head may be moved vertically for substantially the length of the table top whenever the top is in vertical position.

4. X-ray apparatus of the class described, comprising a frame, a Bucky track carried thereby, a table top mounted for tiltable movement with respect to the frame, a tube head and a fluoroscopic screen, means for mounting said head and screen for movement in directions extending longitudinally, transversely and vertically of the table, said Bucky track including a member extending longitudinally from one end of the frame and bent back upon itself intermediate the ends of the frame, whereby said track terminates short of the length of the table to provide an opening through which the tube head may be moved for positioning either above or beneath the table top.

5. X-ray apparatus of the class described, comprising a table having a frame, a top tiltably mounted thereon and a Bucky track disposed beneath the top and spaced therefrom, one member of said track comprising a U-shaped bar having its ends connected to the frame adjacent one end thereof and having its intermediate portion terminating short of the length of the frame so as to provide an opening between it and the opposite end of the frame, a tube head and a fluoroscopic screen, means mounting said head and screen as a unit for movement in a direction extending vertically of the table, said head being adapted to be passed through said opening for positioning thereof either above or beneath the table top.

6. X-ray apparatus of the class described, comprising a column, a support therefor, a carriage movable along the column, said carriage having a post projecting horizontally therefrom, an arm pivotally mounted on said post, said arm having an extension projecting laterally therefrom, a tube head carried by the extension, a fluoroscopic screen supporting arm pivotally connected to the free end of the first mentioned arm, a lever pivotally mounted on said post, means connecting one end of the lever to the screen supporting arm, a spring connecting the other end of the lever to the first mentioned arm, said post having a disc carried thereby and having an abutment thereon adapted to act upon the spring to vary the loading thereof during movement of the arm about the axis of said post.

7. X-ray apparatus comprising in combination a column, a support therefor, a carriage mounted for movement along the column, an arm pivotally mounted on the carriage, a tube head carried by the arm adjacent one end thereof, a fluoroscopic screen unit mounted on the arm adjacent the other end thereof, said arm being adapted to be moved with respect to the carriage and to be disposed in either vertical or horizontal position with respect to the column, a counter-balance coacting between the screen unit and the arm, means for rendering said counter-balance inactive with respect to the fluoroscopic screen unit whenever the bracket is in horizontal position, and means cooperating with said arm to render the counter balance active to progressively raise the screen unit as the arm is swung into vertical position.

8. X-ray apparatus comprising in combination a column, a support therefor, a carriage movable along the support, a post rigid with the carriage and projecting laterally therefrom, an arm having one end thereof pivotally mounted on said post, a disc fixed to the post and having notches therein, a latching device carried by the arm and including a member adapted selectively to engage said notches and to hold the arm in either horizontal or vertical position with respect to the column, a fluoroscopic screen supporting member pivotally connected to said arm adjacent the free end thereof and counterbalancing means carried by said arm and including a lever pivoted intermediately to the post, a spring connected to one end of the lever and to the arm respectively, and a rod connecting the other end of the lever to said member, said disc having an abutment adapted to act upon the spring upon movement of the arm with respect to the carriage from horizontal to vertical position so as to lift the screen carrying member whenever the arm is swung from horizontal to vertical position.

9. X-ray apparatus of the class described, comprising a table having a stationary supporting frame and a top tiltably carried thereby, said frame including a guideway adjacent the bottom thereof, a carriage mounted for movement within said guideway, a tube within said guideway, a column supported upon the carriage, a tube head and a fluoroscopic screen unit mounted for movement along the column, said top being tiltable to a vertical position, a latch pivotally carried adjacent the guideway and adapted to engage and hold the carriage in a predetermined position, and a lever arm coacting between the latch and the table top in vertical position to position the latch into engagement with the carriage.

10. X-ray apparatus comprising a table having a frame, a top tiltable with respect thereto, a carriage movable along the frame, a tube head and a fluoroscopic screen unit mounted for movement with the carriage, a latching lever pivoted to the frame, a second lever pivoted to the frame and also pivotally connected to the table top, a link connecting said levers and operating to hold the latching lever in locking position whenever the table top is disposed vertically with respect to the frame, and operating automatically to permit movement of the latching lever about its pivot whenever the top has been moved a predetermined extent toward horizontal position with respect to the frame.

11. X-ray apparatus comprising, a table having a frame, a tiltable top, a tube head, a fluoroscopic screen unit, means supporting the head and screen unit for movement in unison in directions extending longitudinally, transversely and vertically with respect to the table top, said frame having a table top engaging latch at a predetermined position in the path of said supporting means to maintain the top locked against tilting movement, and said supporting means having a device adapted to engage and release said latch at such predetermined position in its path of travel.

12. X-ray apparatus comprising in combination, a table having a frame, a top tiltably mounted thereon, said frame including a trackway, a carriage movably mounted along the trackway, a column supported on the carriage and extending above the table along one side thereof, a tube head and a fluoroscopic screen unit supported by the carriage and adapted to extend transversely of the table top, said tube head and said fluoroscopic screen unit mounted for movement along the column and for adjustment about an axis with respect thereto, said frame having a table top engaging latch at a predetermined position in the path of said carriage to maintain the top locked against tilting movement, and said carriage having a device for engaging and releasing said latch at such predetermined position in its path of travel.

13. X-ray apparatus comprising in combination, a table including a frame having spaced ends, a table top having a tiltable connection at one end of the frame, a latching member pivotally mounted at the other end of the frame and adapted to engage the table top to hold it in locked position with respect to the frame, a carriage mounted for movement longitudinally of the table between the frame ends, a tube head and a fluoroscopic screen unit supported by the carriage and adapted to extend transversely of the table top, said carriage having means for engaging and releasing the latch whenever the carriage is positioned adjacent the latching end of the frame to enable the table top to be tilted without interference from the tube head and fluoroscopic screen unit.

14. X-ray apparatus of the class described comprising a stationary frame embodying a table having a top mounted thereon for tilting movement with respect thereto, a carriage mounted for movement on the frame longitudinally with respect to the top, a column mounted on the carriage, a second carriage movably mounted upon the column, a tube head and a fluoroscopic screen carried by the second carriage and mounted thereon for adjustment together as a unit with respect to said second carriage, and latch means coacting between the top and frame for automatically locking the top in vertical position with respect to the frame.

15. X-ray apparatus comprising a stationary frame embodying a table having a top mounted for tilting movement with respect thereto, a tube head, a fluoroscopic screen unit, a carriage, a supporting column carried by said carriage, means mounting said head and screen unit upon said supporting column in spaced relation for adjustment together as a unit about an axis, and means mounting the carriage on the frame for movement longitudinally and transversely of the top, said frame including an opening adjacent one side of the table whereby the tube head may be positioned either beneath or above the table top.

16. X-ray apparatus comprising a stationary frame embodying a table having a top mounted for tilting movement with respect thereto, a tube head, a fluoroscopic screen unit, a carriage, a supporting column carried by said carriage, means movably mounting said head and screen unit upon said supporting column in spaced relation for adjustment together as a unit about an axis, and means mounting the carriage on the frame for movement longitudinally and transversely of the top, said frame including an opening adjacent one side of the table whereby the tube head may be positioned either beneath or above the table top.

17. X-ray apparatus comprising a stationary frame embodying a table having a top mounted for tilting movement with respect thereto, a tube head, a fluoroscopic screen unit, a carriage, a supporting column carried by said carriage, a second carriage mounted for vertical movement along said column, means mounting said head and screen unit upon said second carriage in spaced relation for adjustment together as a unit about an axis, and means mounting the first carriage on a frame for movement longitudinally and transversely of the top, said frame including an opening adjacent one side of the table whereby the tube head may be positioned either beneath or above the table top.

18. X-ray apparatus comprising a stationary frame embodying a table having a top mounted for tilting movement with respect thereto, a tube head, a fluoroscopic screen unit, a carriage, said frame including an opening adjacent one side of the table whereby the tube head may be positioned either beneath or above the table top, a supporting column carried by said carriage adjacent the open side of said table, a second carriage mounted for vertical movement along said column, means mounting said tube head and screen unit upon said second carriage in spaced relation for adjustment together as a unit about an axis, and means mounting the first carriage on the frame for movement longitudinally and transversely of the table top.

EDWIN R. GOLDFIELD.
ROBERT J STAVA.

References Cited in the file of this patent

UNITED STATES PATENTS

| Number | Name | Date |
| --- | --- | --- |
| 1,015,187 | Kelly | Jan. 16, 1912 |
| 1,074,120 | Hutton | Sept. 30, 1913 |
| 1,599,696 | Wantz | Sept. 14, 1926 |
| 1,925,425 | Wilent | Sept. 5, 1933 |
| 1,957,720 | Nelson | May 8, 1934 |
| 2,024,351 | Fischer et al. | Dec. 17, 1935 |
| 2,082,965 | Lundquist | June 8, 1937 |
| 2,097,095 | Goldfield et al. | Oct. 26, 1937 |
| 2,128,655 | Linke et al. | Aug. 30, 1938 |
| 2,208,258 | Grobe | July 16, 1940 |
| 2,259,036 | Goldfield et al. | Oct. 14, 1941 |
| 2,311,581 | Simmon | Feb. 16, 1943 |
| 2,315,786 | Grobe | Apr. 6, 1943 |
| 2,434,827 | Akers | Jan. 20, 1948 |
| 2,441,538 | Steinhaus | May 11, 1948 |
| 2,456,098 | Wehmer | Dec. 14, 1948 |
| 2,501,756 | Berggren | Mar. 28, 1950 |

FOREIGN PATENTS

| Number | Country | Date |
| --- | --- | --- |
| 473,824 | Great Britain | Oct. 20, 1937 |
| 572,321 | Great Britain | Oct. 2, 1945 |